(12) United States Patent
Solberg et al.

(10) Patent No.: US 7,597,617 B2
(45) Date of Patent: Oct. 6, 2009

(54) GAS DIFFUSION DEVICE

(76) Inventors: Andrew Solberg, 5370 Kietzke La., Reno, NV (US) 89511; Keith Kibbee, 2020 SW. Ave., Portland, OR (US) 97201; Bart Naughton, 1055 Shary Ct., Concord, CA (US) 94518

( * ) Notice: Subject to any disclaimer, the term of this patent is extended or adjusted under 35 U.S.C. 154(b) by 204 days.

(21) Appl. No.: 11/713,422

(22) Filed: Mar. 2, 2007

(65) Prior Publication Data
US 2008/0209870 A1    Sep. 4, 2008

(51) Int. Cl.
F24F 13/06    (2006.01)
F24F 13/08    (2006.01)
B01L 1/04    (2006.01)

(52) U.S. Cl. .................. 454/187; 454/190; 454/284; 454/292; 454/296

(58) Field of Classification Search .......... 454/187, 454/190, 284, 292, 296
See application file for complete search history.

(56) References Cited

U.S. PATENT DOCUMENTS

| | | | | | |
|---|---|---|---|---|---|
| 3,505,989 | A | * | 4/1970 | Truhan | .................. 600/21 |
| 3,776,121 | A | * | 12/1973 | Truhan | .................. 454/187 |
| 4,009,647 | A | * | 3/1977 | Howorth | .................. 454/187 |
| 4,137,831 | A | * | 2/1979 | Howorth | .................. 454/187 |
| 4,531,956 | A | * | 7/1985 | Howorth | .................. 96/223 |
| 5,192,348 | A | | 3/1993 | Ludwig | |
| 5,275,729 | A | | 1/1994 | Gris | |
| 5,437,701 | A | | 8/1995 | Townsley | |
| 5,573,811 | A | | 11/1996 | Townsley | |
| 5,725,427 | A | | 3/1998 | Koerber | |
| 5,753,191 | A | * | 5/1998 | Yamamoto et al. | .......... 422/143 |
| 5,779,534 | A | | 7/1998 | Kunec | |
| 5,922,096 | A | | 7/1999 | Stemmer | |
| 5,968,373 | A | | 10/1999 | Choi | |
| 6,059,655 | A | | 5/2000 | Koerber | |
| 6,089,598 | A | | 7/2000 | Snyder et al. | |
| 6,139,426 | A | | 10/2000 | Koerber | |
| 6,425,821 | B1 | | 7/2002 | Koerber et al. | |
| 6,656,243 | B2 | | 12/2003 | Hodge | |
| 6,942,563 | B2 | | 9/2005 | Pessch et al. | |
| 2004/0198215 | A1 | * | 10/2004 | Bridenne et al. | ............ 454/187 |

FOREIGN PATENT DOCUMENTS

| | | | |
|---|---|---|---|
| EP | 0844147 A1 | | 5/1998 |
| JP | 60050329 A | * | 3/1985 |
| JP | 63176943 A | * | 7/1988 |

* cited by examiner

Primary Examiner—Steven B McAllister
Assistant Examiner—Patrick F. O'Reilly, III
(74) Attorney, Agent, or Firm—Theodore J. Bielen, Jr.

(57) ABSTRACT

A gas diffusion device used in conjunction with a flow of gas from a conduit utilizing a sheet having a peripheral edge defining a surface inwardly from the edge. The surface possesses a first zone, and a second zone between the first zone and the peripheral edge. A first plurality of apertures through the sheet lie in the first zone. A second plurality of apertures through the sheet lie in the second zone. The percentage of open area of the first plurality of apertures relative to the area of the first zone is less than the percentage of open area due to the second plurality of apertures through the second zone.

7 Claims, 4 Drawing Sheets

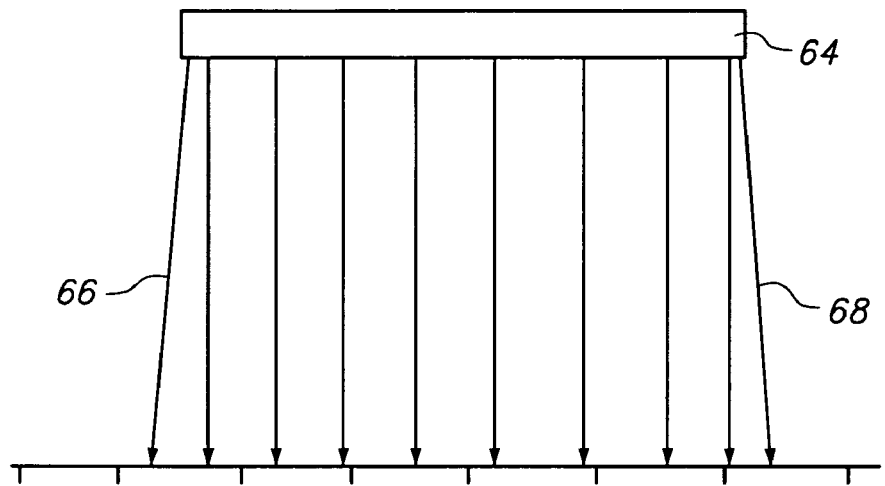
FIG. 5 *(PRIOR ART)*
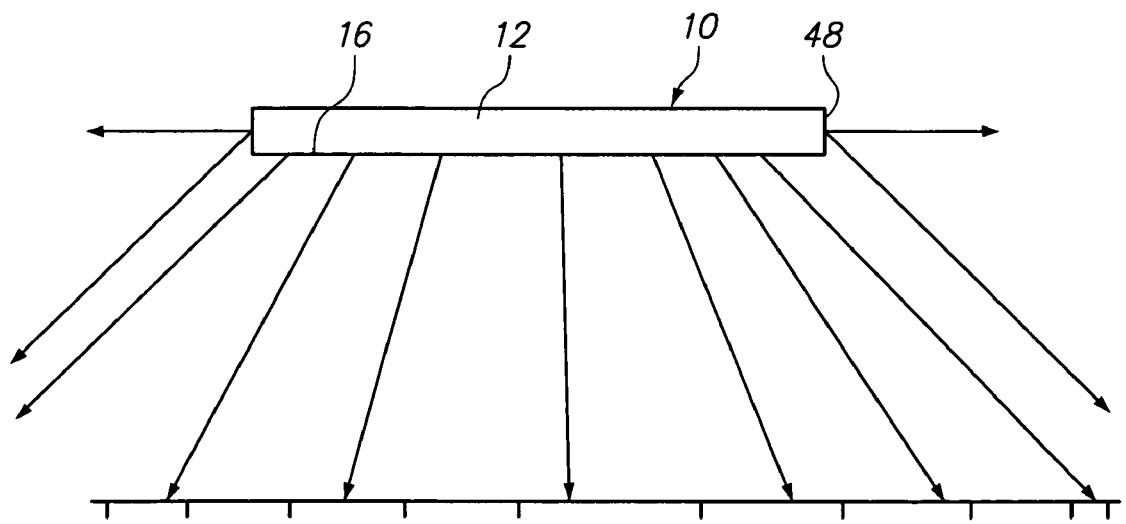
FIG. 6

GAS DIFFUSION DEVICE

BACKGROUND OF THE INVENTION

The present invention relates to a novel and useful gas diffusion device.

Air circulation in closed spaces is necessary in order to occupy and use a building or structure. In certain cases proper circulation is critical to many activities such as operations in a medical facility, in the manufacturing of microchips, and the like. Improving the ventilation in a space does not necessarily correlate to increasing the power of airflow through the employment of larger fans or blowers, rather it is often necessary to control the direction and distribution of supply air in order to provide a laminar, unidirectional flow of gas, such as air. Such a criteria greatly minimizes the production of vortices, which tend to inhibit the removal of particulate matter and heat from the air in a facility.

In this regard, many air diffusers have been proposed to direct air in a certain direction from the outlet of a conduit delivering air to a facility. For example, U.S. Pat. Nos. 5,573,811 and 5,437,701 show a foam air filter coated by oil to improve the air filter characteristics of the device.

U.S. Pat. Nos. 5,779,534 and 5,968,373 describe diffusers and filters that use multi stage layers to distribute gas and prevent the passage of particulate matter.

U.S. Pat. Nos. 5,275,729, 5,922,096, and 6,656,243 show air filters that use pleated cores that filter particulate matter.

U.S. Pat. No. 6,089,598, and European patent application EPO 844147 describe multiple layer air filter cartridges which are employed to inflate devices.

U.S. Pat. No. 6,425,821 teach a fluid diffuser in which air is redirected after passing through an initial diffuser by the use of angled fluids supplies or vanes deflecting air at the exit of the diffuser.

U.S. Pat. Nos. 5,725,427 and 6,059,655 show air diffuser inserts which employ woven fabric or sheets.

U.S. Pat. No. 6,139,426 utilizes a molded plastic air diffusing screen which minimizes noise and includes openings of uniform size.

U.S. Pat. Nos. 5,192,348 and 6,942,563 describe air guides and diffuser panels which are perforated throughout. Perforations are varied in angles and size at various surfaces of the diffusers.

A gas diffusion device which distributes incoming air to a facility in an efficient manner with a laminar or turbulent flow pattern would be a notable advance in the field of ventilation technology.

BRIEF SUMMARY OF THE INVENTION

The present invention relates to a novel and useful gas diffusion device.

The device of the present invention utilizes a source of gas or air which exits a conduit and enters a particular space which is to be ventilated. The device of the present invention includes a sheet having a peripheral edge which defines a surface inwardly from the same. Such surface is generally flat and includes a first zone having a area of a pre-determined size. The surface of the flat sheet also possesses a second zone with an area that lies between the first zone and the peripheral edge.

A first plurality of apertures are positioned in the first zone of the surface. The plurality of apertures through the first zone possess a first percentage of open area relative to the total area of the first zone. Likewise, a second plurality of apertures are placed through the flat sheet of the second zone and possess a second percentage of the open area pertaining to the first zone is less than the second percentage of open area pertaining to the second zone. In addition, successive third and fourth zones may be formed progressively towards the peripheral edge. The third and fourth zones would also include a plurality of apertures which possess a higher percentage of open area relative to a particular zone. That is to say, as the zones progress from the central portion of the surface of the flat sheet, the percentage of open area relative to the area of the zone increases.

A mount is also found in the present invention for holding the flat sheet adjacent the conduit to allow the gas or air to flow from the conduit through the diffusion device of the present invention.

It maybe also mentioned that the peripheral edge of the flat sheet maybe formed into a polygon such a square, rectangle, triangle, pentagon, and the like. In addition, the peripheral edge of the flat sheet may be at least partially curved. In certain cases, the peripheral edge may be circular.

In many cases, the successive zones emanating from the center of the flat sheet may take a surrounding or encircling formation. That is to say, the third zone may surround the second zone which surrounds the first zone.

A wall may also be included in the present invention to extend from the surface from the flat sheet. The wall may also possess a plurality of openings to direct air through the diffusion device of the present invention in a largely lateral direction at a predetermined distance from the ceiling of a room to prevent interference with sundry equipment.

It may be apparent that a novel and useful gas diffusion device has been hereinabove described.

It is therefore an object of the present invention to provide a gas diffusion device which allows the passage of air through the same in a laminar manner and over a wide swath.

Another object of the present invention is to provide a gas diffusion device which distributes incoming air from a conduit into a space in a laminar flow manner.

A further object of the present invention is to provide a gas diffusion device which distributes air into a space from a gas conduit and minimizes the formation of vortices and other disruptive air patterns.

Yet another object of the present invention is to provide a gas diffusion device which may be retrofitted into existing air distribution systems in buildings and provide laminar flow distribution over a wide area within such facility.

Another object of the present invention is to provide a gas diffusion device which does not include moving parts and is easily manufactured, cleaned and maintained.

A further object of the present invention is to provide a gas diffusion device which efficiently controls particulate matter and heating effects and permits the use of fewer diffusion devices than the prior art.

Another object of the present invention is to provide a gas diffusion device which produces a gas diffusion device which produces a downwardly flushing turbulent flow of gas.

The invention possesses other objects and advantages especially as concerns particular characteristics and features thereof which will become apparent as the specification continues.

BRIEF DESCRIPTION OF THE SEVERAL VIEWS OF THE DRAWING

FIG. 5 is a schematic side elevational view of the distribution characteristics of prior art diffusers.

FIG. 6 is a schematic side elevational view of the diffusion device of the present invention showing its air distribution characteristics.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
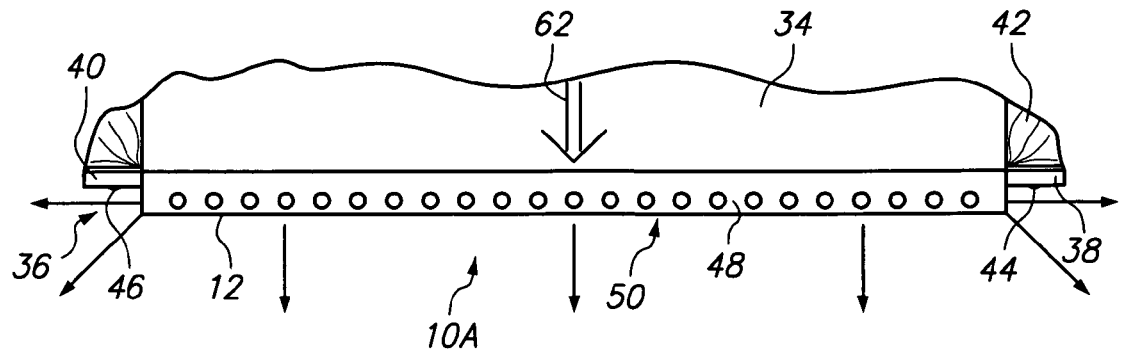
FIG. 1 is a side elevational view showing the device of the present invention in place and an inlet conduit, shown partially.
Figure 2:
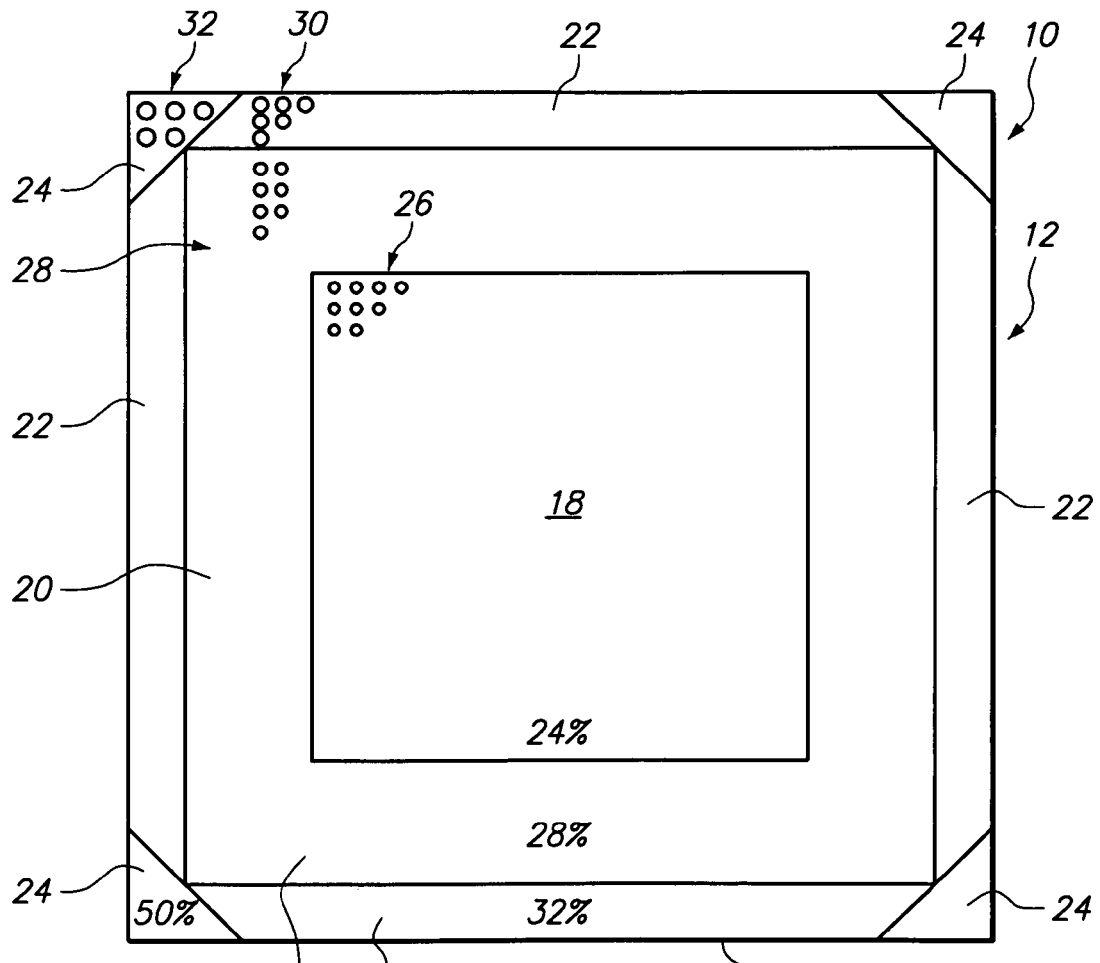
FIG. 2 is a bottom plan view of the device depicted in FIG. 1.

Embodiments of the invention as a whole are depicted in the drawings by reference character 10 followed by an upper case letter. With reference to FIG. 1, it may be observed that diffuser device 10A is shown. Diffuser device 10A includes as one of its elements a flat sheet 12. Sheet 12 includes a peripheral edge 14 which defines an inner surface 16, FIG. 2. As it is illustrated in FIG. 2, surface 16 includes zones 18,20, 22, and 24. It should be realized, that the lines appearing on FIG. 2 are for the sake of visualizing such zones and do not appear on the actual device. A plurality of apertures 26,28,30, and 32 are associated with zones 18,20,22, and 24, respectively. It may also be seen, that plurality of apertures 26,28,30, and 32 increase in size between central zone 18 and corner zones 24. That is to say, that the percentage of open area of plurality of apertures 26 of zone 18 is of a certain value relative to the total area of zone 18. A plurality of openings 28, of larger size, of zone 20 form another percentage of open area relative to zone 20. In the embodiment depicted in FIG. 2, the following table represents typical percentages of open area of apertures relative to the total area of a particular zone:

TABLE I

| ZONE | % OF OPEN AREA OF APERTURES |
| --- | --- |
| 18 | 24% |
| 20 | 28% |
| 22 | 32% |
| 24 | 50% |
| Wall 48 | 50% |

Such percentages also appear on FIG. 2. It should also be realized that the apertures illustrated on FIG. 2 represent a small portion of the actual apertures of each particular zone. In other words, evenly spaced apertures, such as those shown on FIG. 2, occupy the entire zone in the pattern depicted in FIG. 2. It should also be realized that plurality of apertures 26,28,30, and 32 extend completely through sheet 12 in order to communicate with conduit 34, FIG. 1.

A mount 36 is also found in the present invention for holding diffusion device 10A to a structure such as a ceiling, a cross-beam, and the like. Mount 36 shown in FIG. 1 takes a form of flanges 38 and 40 which are connected to structure 42 by the use of fasteners 44 and 46.

Device 10 may also be formed with a wall 48 having a plurality of apertures 50 therethrough. Thus, air flow may also be directed outwardly through wall 48 via plurality of apertures 50.

Figure 3:
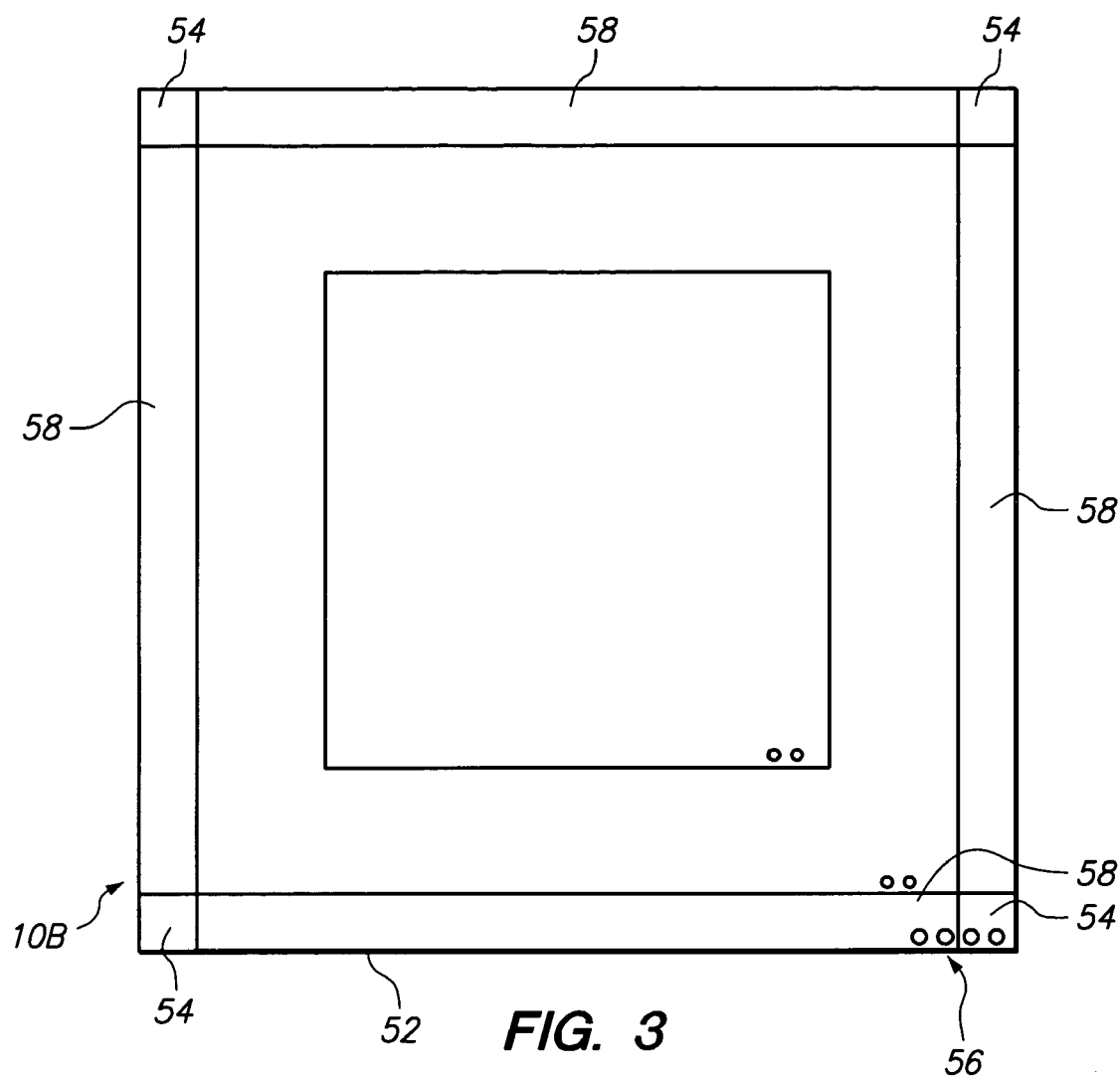
FIG. 3 is a bottom plan view of the device of the present invention in another embodiment.
Figure 4:
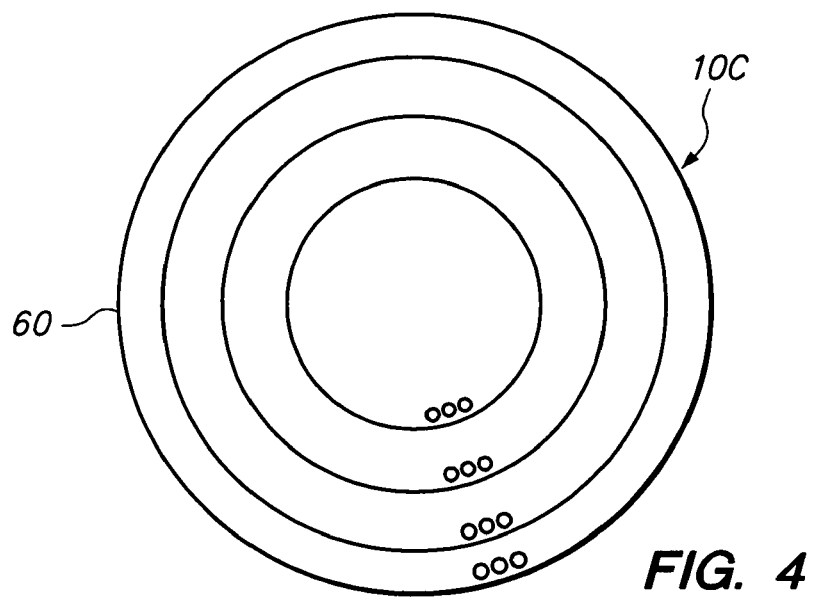
FIG. 4 is a bottom plan view of the device of the present invention in yet another embodiment.

FIGS. 3 and 4 represent embodiments 10B and 10C. Embodiment 10B includes a peripheral edge which is square in shape. However, corners zones 54 are also square in shape rather than the triangular formation of embodiment 10A shown as corners 24 of FIG. 2. Plurality of openings 56 occupying zones 54 of FIG. 3 may also extend as a single row about periphery 52 and lie outside the remaining smaller apertures of zone 58. Peripheral edge 60 of embodiment 10C is curved and, more specifically, in the shape of a circle. Again, the plurality of apertures of the particular zones would increase in size, as well as the percentage of the open area relative to the total area of the zone, progressing from the inner most zone to the outer most zone as depicted in FIG. 3 and FIG. 4.

Figure 7:
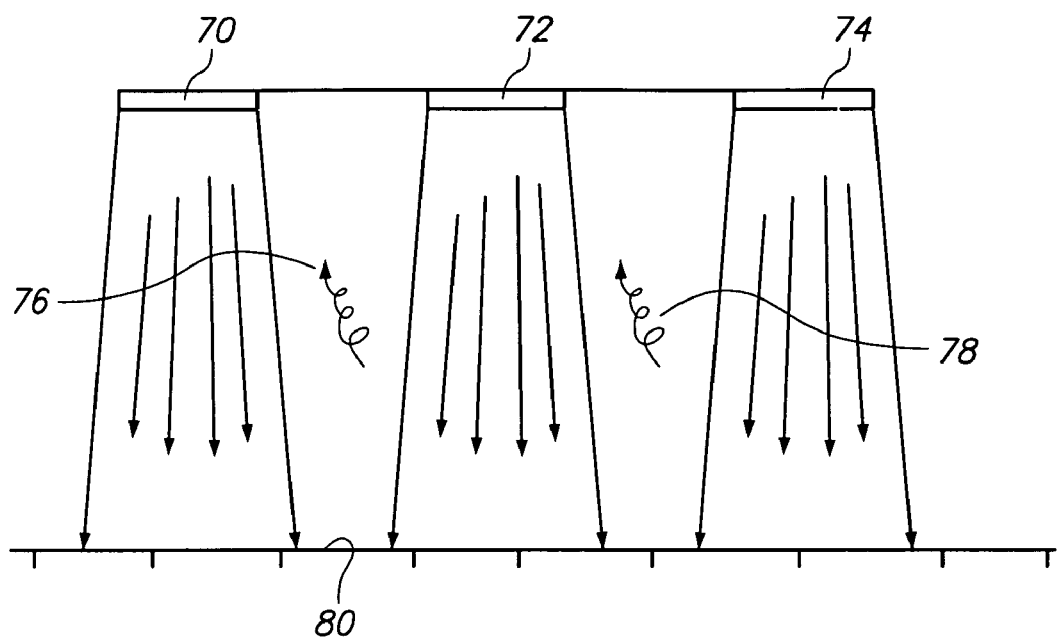
FIG. 7 is a schematic side elevational view showing prior art diffusers and the patterns produced by the same.
Figure 8:
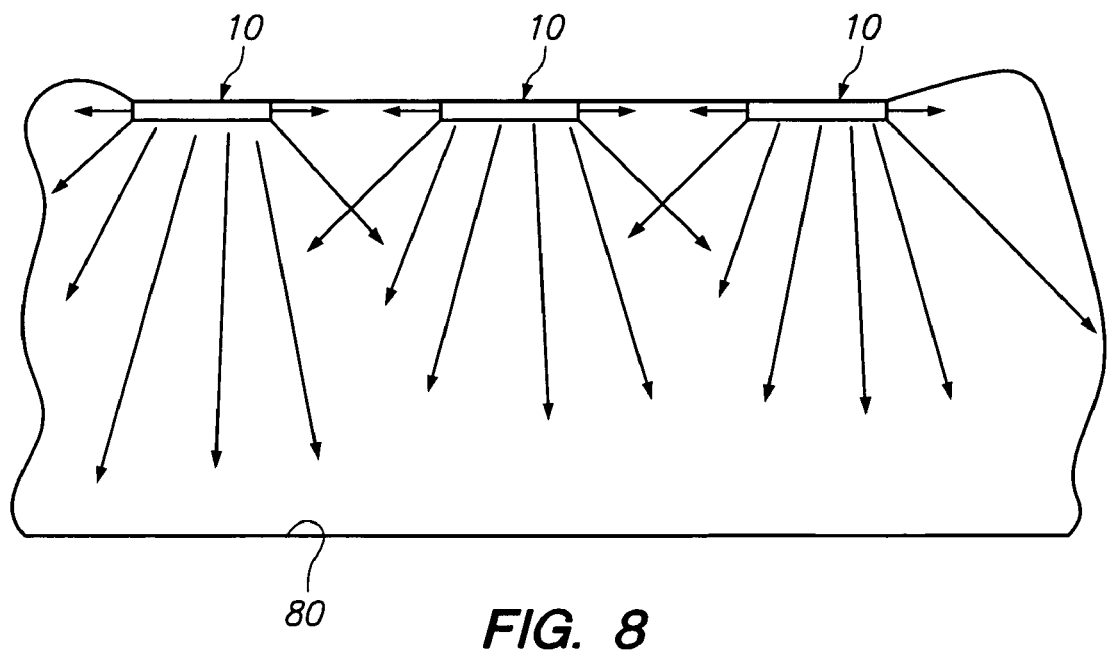
FIG. 8 is a schematic side elevational view showing multiple diffusion devices of the present invention in place and the patterns produced by the same.

In operation, diffusion device 10A of the present invention is mounted to the outlet of a conduit 34 which serves as a source of air flow, directional arrow 62, into a space below diffusion device 10A. Diffusion device 10A is fixed to a place adjacent conduit 34 by mount 36. Air then passes through plurality of apertures 26,28,30, and 32 of sheet 12 in a laminar flow pattern and at a significant spreading angle. It is believed that flow distribution from device 10 is generated by differential pressure drops among the various zones 18,20,22, and 24. With reference to FIG. 5, it may be observed that the prior art diffuser 64 distributes air in a laminar manner with a slight spread indicated by angular vectors 66 and 68. In contrast, diffuser 10A of FIG. 6 shows a laminar flow distribution which spreads widely, 40 to 45 degrees from diffuser 10. However, diffuser 10A may produce a downwardly flushing turbulent flow or combination of laminar and turbulent flow by adjusting the size of the plurality of apertures 26,28,30 and 32. The effect of such wide distribution by diffuser 10 of the present invention may be observed in FIGS. 7 and 8 in which prior art diffusers 70,72, and 74, create areas 76 and 78 in which vortices are formed. Such vortices tend to disrupt the laminar flow directly beneath such diffusers. In contrast, FIG. 8 represents diffusion devices 10A of the present invention in which laminar flow prevails over a wide area above surface 80. This distribution is due to the varying of the open area formed by the apertures for a particular zone of surface 16 which progressively increases from the center of the diffuser surface 16 to the peripheral edge 14. Thus, the formation of disruptive vortices is avoided with the diffusion devices 10A-C of the present invention.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A gas diffusion device used in conjunction with a particular flow of the gas exiting a conduit, comprising:
    a. a flat sheet, said flat sheet having a peripheral edge defining a surface therewith, said surface including a first zone having an area, said first zone being inwardly positioned relative to said peripheral edge, and a second zone having an area, said second zone lying between said first zone and said peripheral edge;

b. a first plurality of apertures through said flat sheet at said first zone of said surface, said first plurality of apertures constituting a first percentage of open area relative to said area of said first zone;

c. a second plurality of apertures through said flat sheet at said second zone of said surface, said second plurality of apertures constituting a second percentage of open area relative to the area of said second zone, said first percentage of open area being less than said second percentage of open area;

d. a multisided wall extending outwardly, from said surface of said flat sheet, said wall having an area and including a plurality of apertures through at least three sides of said wall, said plurality of apertures through said wall constituting a particular percentage of open area relative to said area of said wall, said particular percentage of open area at said wall being larger than said first and second percentages of open area and said particular percentage of open area being the same for all three sides of said wall; and d. a mount for holding said flat sheet adjacent the conduit.

2. The device of claim 1 which additionally includes a third zone of said surface, said third zone having an area, said third zone lying between said second zone and said peripheral edge, and a third plurality of apertures through said flat sheet at said third zone, said third plurality of apertures at said third zone constituting a third percentage of open area of the area of said third zone, said second percentage of open area being less than said third percentage of open area, said particular percentage of open area at said wall being larger than said first, second, and third percentages.

3. The device of claim 2 which additionally comprises a fourth zone of said surface, said fourth zone having an area said fourth zone lying between said third zone and said peripheral edge, and a fourth plurality of apertures through said flat sheet at said fourth zone, said fourth plurality of apertures constituting a fourth percentage of open area of the area of said fourth zone, said third percentage being less than said fourth percentage.

4. The device of claim 3 in which said flat sheet peripheral edge comprises a polygon and said fourth zone lies at least at a corner of said polygon.

5. The device of claim 2 in which said third zone at least partially surrounds said second zone.

6. The device of claim 1 in which said sheet peripheral edge is at least partially curved.

7. The device of claim 1 in which said second zone at least partially surrounds said first zone.

* * * * *